(12) United States Patent
Vangsy

(10) Patent No.: US 8,191,253 B2
(45) Date of Patent: Jun. 5, 2012

(54) METHOD FOR FITTING THE ROTOR OF A WIND GENERATOR

(75) Inventor: Bent Vangsy, Silkeborg (DK)

(73) Assignee: Gamesa Innovation & Technology, S.L., Sarriguren (ES)

( * ) Notice: Subject to any disclaimer, the term of this patent is extended or adjusted under 35 U.S.C. 154(b) by 378 days.

(21) Appl. No.: 12/519,242

(22) PCT Filed: Dec. 5, 2007

(86) PCT No.: PCT/ES2007/070202
§ 371 (c)(1),
(2), (4) Date: Jun. 15, 2009

(87) PCT Pub. No.: WO2008/071828
PCT Pub. Date: Jun. 19, 2008

(65) Prior Publication Data
US 2010/0005656 A1    Jan. 14, 2010

(30) Foreign Application Priority Data
Dec. 14, 2006 (ES) .................................. 200603165

(51) Int. Cl.
*B23P 11/00* (2006.01)
(52) U.S. Cl. ...................................................... 29/889.1
(58) Field of Classification Search .................... 29/889, 29/889.1, 428, 464, 466, 467, 469, 729, 721, 29/240, 243.526, 244, 281.1; 416/244 R
See application file for complete search history.

(56) References Cited

U.S. PATENT DOCUMENTS
2006/0151767 A1    7/2006  Wobben
2006/0228220 A1    10/2006 Wobben FOREIGN PATENT DOCUMENTS
| DE | 20 2004 016 460 | 12/2004 |
| ES | 2 224 995 | 3/2005 |
| JP | 2006-152862 | 6/2006 |
| WO | 2004/081373 | 9/2004 |

OTHER PUBLICATIONS

English Abstract of JP 2006-152862 dated Jun. 15, 2006.

*Primary Examiner* — John C Hong
(74) *Attorney, Agent, or Firm* — Ladas & Parry LLP

(57) ABSTRACT

Method of mounting the rotor of a wind turbine (11) comprising the following steps: lifting and mounting the rotor hub (15) on the nacelle (21); lifting and mounting the rotor blades (25, 27, 29) on the rotor hub (15) using a lifting device (17) cooperating with a winch (19) on ground, the mounting of each blade being made after rotating the rotor hub (15) for having the connecting part (25', 27', 29') with each blade (25, 27, 29) in front of it when it is lifted, the lifting device (17) being installed in a fixed position in the rotor hub (15) and comprising, in a preferred embodiment, a bracket (31) mounted on the rotor hub front (16) and a hook block (33) mounted on said bracket (31) with a cable (35) connected to said winch (19). The invention also refers to a method of dismounting a rotor blade.

8 Claims, 2 Drawing Sheets

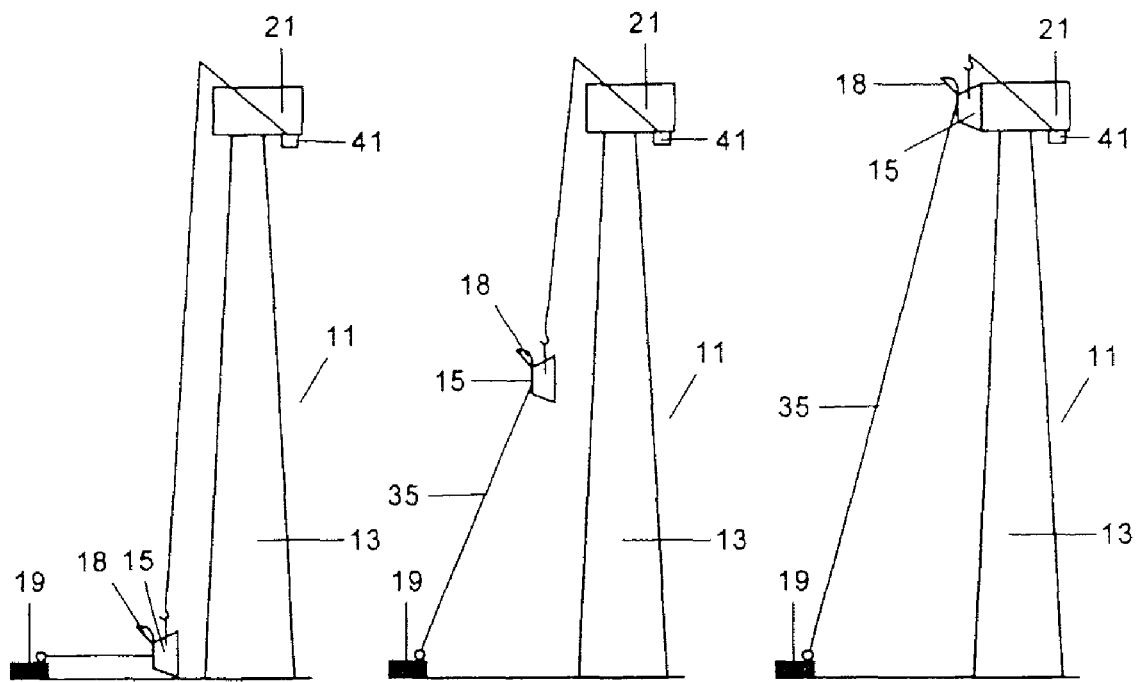
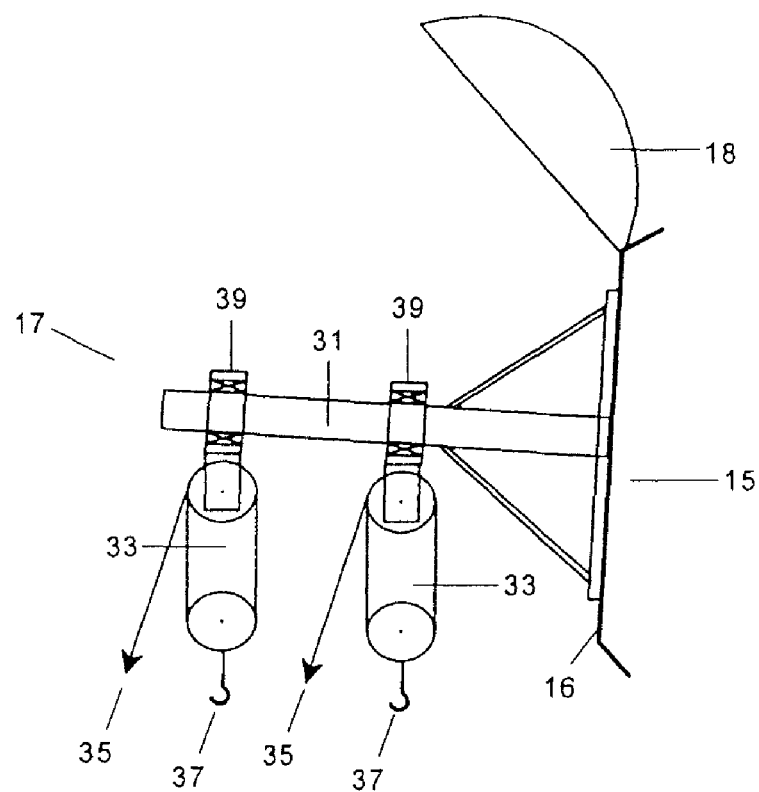

METHOD FOR FITTING THE ROTOR OF A WIND GENERATOR

FIELD OF THE INVENTION

This invention relates to a method of mounting the rotor of a wind turbine and, in particular, to a method of mounting the rotor of a wind turbine which does not use a crane for lifting the rotor blades.

BACKGROUND

The dimensions of modern wind turbine rotors (i.e. rotor diameters about 150 m and rotor weights about 50 tons) require the mounting of the wind turbine components in different steps. In particular, rotors are usually mounted after the mounting of the nacelle on the tower.

Some known rotor mounting methods use mobile cranes for lifting wind turbine rotors previously assembled on ground and mounting the whole assembly to the low speed shaft extending from the nacelle. These methods have become problematic because, on the one hand, the increasing size and weight of the wind turbine rotor, require expensive mobile cranes and, on the other hand, the surroundings of the wind turbine location sometimes limit or hinder the lifting of the complete rotor assembly from the ground because of its impracticability.

There are also known rotor mounting methods using mobile cranes for lifting the wind turbine rotor in several steps. For instance EP 1 507 975 discloses a method comprising a first step in which a sub-assembly of the hub with two blades is lifted and mounted and a second step in which the third blade is lifted and assembled to the hub.

There are also known rotor mounting methods using cranes installed on the wind turbine. EP 1 350 953 discloses a crane that uses one or two previously mounted sections of the tower as its support mast. Once said crane reaches an optimum height, carrying the corresponding component of the wind turbine, it tilts to set in place said component. WO 02/099278 discloses a lifting platform that moves along guide rails fixed to the wind turbine's tower.

There are also known rotor mounting methods for mounting the blades without using a crane. In the method disclosed in WO 2004/067954, it is used a cable—instead of a crane—fixed between a part of the hub and the ground and a blade can be mounted moving it upwards or dismounted moving it downwards along said cable. DE 20 2004 016460 discloses lifting means cooperating with a winch in ground which are mounted in the rotor hub in different positions for the lifting and mounting of each blade.

The costs of mobile and stationary cranes demand smaller and simpler crane systems for mounting wind turbine rotors.

The present invention is intended to satisfy this demand.

SUMMARY OF THE INVENTION

It is an object of the present invention to provide an efficient wind turbine rotor mounting method for big wind turbines, particularly for wind turbines with large rotor blades.

This and other objects of the present invention are met by a method of mounting the rotor of a wind turbine supported in a tower comprising the following steps: first, lifting the rotor hub and mounting the rotor hub on the nacelle of the wind turbine; second, lifting the rotor blades and mounting the rotor blade on the rotor hub using a lifting device cooperating with a winch on ground, the mounting of each blade being made after rotating the rotor hub for having the connecting part with each blade in front of it when it is lifted, the lifting device being installed in a fixed position in the rotor hub.

It is another object of the present invention to provide a method for dismounting rotor blades.

This object of the present invention is met by a method of dismounting a rotor blade from the rotor of a wind turbine supported in a tower comprising the following steps: first, rotating the rotor hub for having the rotor blade in its lowest position; second, installing in the rotor hub a lifting device cooperating with a winch on ground; third, dismounting and descending the rotor blade using said lifting device.

Other features and advantages of the present invention will be understood from the following detailed description of illustrative and by no means limiting embodiments of its object in relation with the enclosed drawings.

BRIEF DESCRIPTION OF DRAWINGS

FIGS. 1a, 1b and 1c show schematically the lifting and mounting of the rotor hub according to the present invention.

FIG. 2 shows schematically the lifting device installed on the rotor hub according to the present invention.

DETAILED DESCRIPTION OF PREFERRED EMBODIMENTS

Figure 3A:
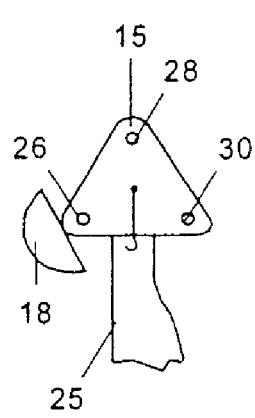
FIGS. 3a, 3b and 3c show the rotor hub rotation during the mounting of three rotor blades according to the present invention.

A typical wind turbine 11 comprises a tower 13 supporting a nacelle 21 housing means for converting the rotational energy of the wind turbine rotor into electrical energy.

The wind turbine rotor comprises a rotor hub 15 and, typically, three blades 25, 27, 29.

The rotor hub 15 is connected to the main shaft, the gearbox and the generator of the wind turbine for transferring the torque generated by the rotor to the generator and increase the shaft speed in order to achieve a suitable rotational speed of the generator rotor.

The method of mounting a rotor on a wind turbine 11 according to the present invention starts after the tower 13 has been erected and the nacelle 21 has been mounted on top of the tower 13.

In a preferred embodiment of the present invention the first step of the method of mounting the rotor on a wind turbine 11 comprises the installation on ground of a lifting device 17 on the rotor hub 15 and the lifting and mounting of the rotor hub 15.

The lifting device 17, in cooperation with the winch 19 on ground, will be used as an auxiliary lifting means for lifting the rotor hub 15 and as the main lifting means for lifting the rotor blades 25, 27, 29.

The lifting device 17 comprises a bracket 31 mounted on the rotor hub 15 and a hook block 33 with a hook 37 mounted on said bracket 31 having a cable 35 connected to said winch 19 on ground. The bracket 31 is mounted in the rotor hub front section 16 to which the tip of spinner 18 is attached so that the tip of spinner 18 shall be opened while the lifting device 17 is installed on the rotor hub 15.

The rotor hub 15 is lifted and mounted on the nacelle 21 of the wind turbine using a stationary crane 41 installed on the nacelle 21. The lifting device 17 it is also used, if needed, as illustrated in FIG. 1 for keeping the rotor hub 15 free from collide with the tower 13 when the rotor hub 15 is lifted.

In the second step, the rotor blades 25, 27, 29 are lifted using said lifting device 17 and mounted on the rotor hub 15 one by one.

Figure 3B:
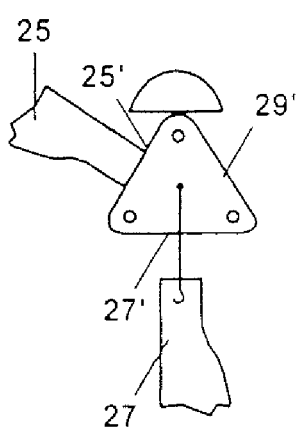
Figure 3C:
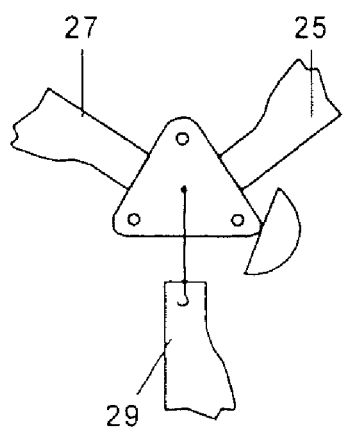
Figure 4:
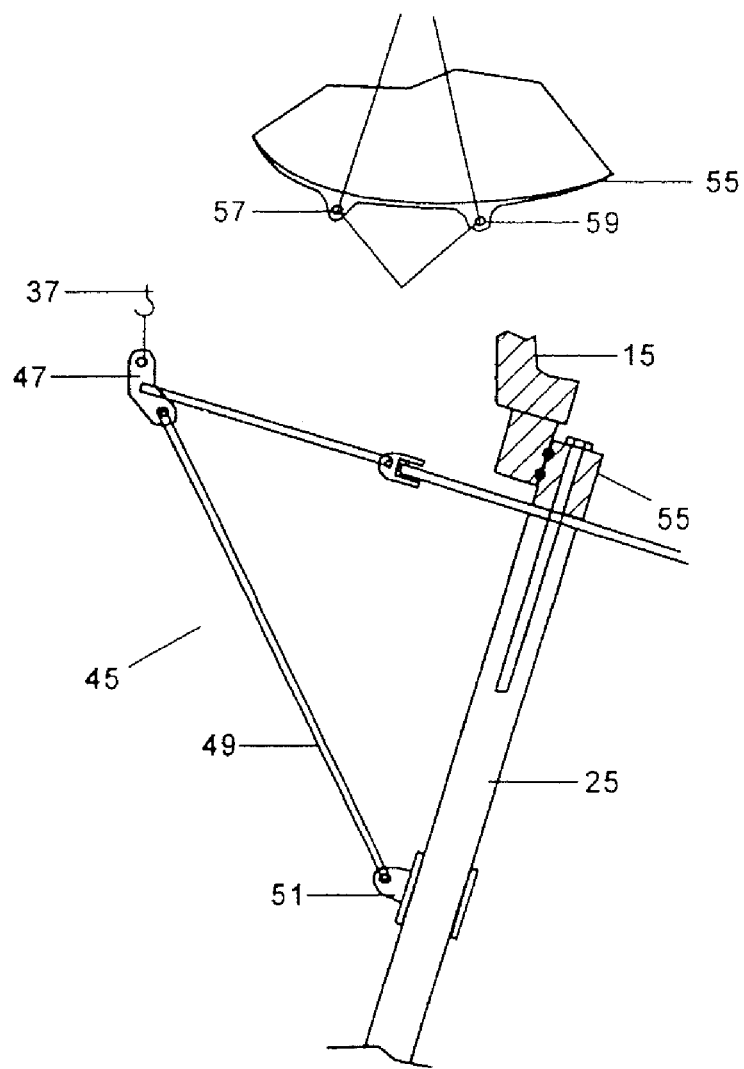
FIG. 4 shows schematically the gripping unit used for lifting the rotor blades according to the present invention.

As illustrated in FIGS. 3a, 3b and 3c the rotor hub 15 is rotated 120°, using an ad-hoc turning device (not shown), for having each connecting part 25', 27', 29' in front of each blade 25, 27, 29 when it is lifted.

The mounting of blades 25, 27, 29 includes its connection with the pitching hydraulic cylinders 26, 28, 30 mounted on the front part of the rotor hub 15. In order to avoid any collision between the hook block 33 and said hydraulic cylinders 26, 28, 30 during the rotations of the rotor hub 15, it is necessary that the mounting arrangement 39 of the hook block 33 on the bracket 31 allows a movement along the bracket 31 so that it can be fixed in two positions: one for lifting the blades 25, 27, 29, another one for rotating the rotor hub 15.

On the other hand, the mounting arrangement 39 of said hook block 33 on said bracket 31 includes means that allows the hook block 33 to be in vertical position all time.

In a preferred embodiment the hook block 33 is a 4 fold hook block, meaning that for blades of 14 tons the cable 35 pull from helping winch 19 on ground need to be about 4 ton (4×4 ton=16 ton>14 ton).

The lifting of blade 25 is made taking the blade 25 with the hook 37 of the lifting device 17 through a gripping device 45 that allows that the blade 25 is lifted with a tilt angle with respect to a vertical line comprised between 5° and 15°, preferably 10°.

In a preferred embodiment said gripping device 45 comprises a hook connector 47 with fixation points for the two ends of a rope 49 passing by a hole in a fitting 51 attached to the blade 25 outside its root and two holes 57, 59 in fittings attached to the blade root 55.

After the mounting of the blades 25, 27, 29 all lifting and mounting means are dismounted. The lifting device 17 is removed using means installed on the nacelle 21 and the tip of the spinner 18 is closed. Then each blade is turned upwards and its gripping unit 45 is removed standing outside and upon the spinner. The turning device used for turning the rotor hub 15 and the stationary crane 41 used for lifting the rotor hub 15 are also removed.

Finally, the present invention also refers to a method of dismounting rotor blades using the same lifting means 17 used in the above described method for mounting the rotor of a wind turbine.

The method comprises a first step in which the rotor hub 15 is rotated for having the rotor blade to be dismounted in its lowest position, a second step in which a lifting device 17 cooperating with a winch 19 on ground is installed in the rotor hub 15 and a third step in which the blade is dismounted and descended using said lifting device 17.

Although the present invention has been fully described in connection with preferred embodiments, it is evident that modifications may be introduced within the scope thereof, not considering this as limited by these embodiments, but by the contents of the following claims.

The invention claimed is:

1. A method of mounting a rotor of a wind turbine (11) supported in a tower (13), comprising the following steps:
    a) lifting a rotor hub (15) and mounting the rotor hub (15) on a nacelle (21) of the wind turbine (11);
    b) lifting some rotor blades (25, 27, 29) and mounting the rotor blades (25, 27, 29) on the rotor hub (15) using a lifting device (17) cooperating with a winch (19) on ground keeping a distance with the tower (13), the mounting of each blade being made after rotating the rotor hub (15) for having a connecting part (25', 27', 29') of the rotor hub (15) in front of each blade (25, 27, 29) when each blade is lifted, the lifting device (17) being installed in a fixed position in the rotor hub (15).

2. The method of mounting the rotor of a wind turbine (11) according to claim 1, wherein said lifting device (17) comprises:
    a bracket (31) mounted on the rotor hub front (16); and
    a hook block (33) mounted on said bracket (31) with a cable (35) connected to said winch (19).

3. The method of mounting the rotor of a wind turbine (11) according to claim 2, wherein in step b) the lifting of one blade (25) is made taking the blade (25) with a hook (37) of the hook block (33) through a gripping device (45) and some fittings joined to the blade, keeping a tilt angle of the blade (25) with respect to a vertical line comprised between 5° and 15°.

4. The method of mounting the rotor of a wind turbine (11) according to claim 3, wherein the hook block (33) is mounted on said bracket (31) by a mounting arrangement (39), wherein said mounting arrangement (39) comprises conventional means which allow that the hook block (33) remains continuously in vertical position.

5. The method of mounting the rotor of a wind turbine (11) according to claim 3, wherein the hook block (33) is affixed on said bracket (31) in at least two positions by a mounting arrangement (39) of said hook block (33) on said bracket (31).

6. The method of mounting the rotor of a wind turbine according to claim 3, wherein a gripping device (45) comprises a hook connector (47) with fixation points for the two ends of a rope (49) passing by a hole in a fitting (51) attached, to the blade (25) outside its root and two holes (57, 59) in fittings attached to a blade root (55).

7. The method of mounting the rotor of a wind turbine (11) according to claim 1, wherein in step a) the rotor hub (15) is lifted using a crane (41) installed on the nacelle (21).

8. The method of mounting the rotor of a wind turbine (11) according to claim 1, wherein the rotor hub (15) is connected to said lifting device (17) on the ground and is lifted in cooperation with the winch (19) to which is connected through the cable (35) keeping a distance with the tower (13).

* * * * *